US007672515B2

(12) United States Patent
Lin et al.

(10) Patent No.: US 7,672,515 B2
(45) Date of Patent: Mar. 2, 2010

(54) OPPOSING EDGE TRAPPING

(75) Inventors: Guo-Yau Lin, Fairport, NY (US); Jon McElvain, Manhattan Beach, CA (US)

(73) Assignee: Xerox Corporation, Norwalk, CT (US)

( * ) Notice: Subject to any disclaimer, the term of this patent is extended or adjusted under 35 U.S.C. 154(b) by 1148 days.

(21) Appl. No.: 11/270,245

(22) Filed: Nov. 9, 2005

(65) Prior Publication Data

US 2007/0103732 A1    May 10, 2007

(51) Int. Cl.
 *G06K 9/48* (2006.01)
(52) U.S. Cl. ..................................... 382/199
(58) Field of Classification Search ........... None
 See application file for complete search history.

(56) References Cited

U.S. PATENT DOCUMENTS 5,014,976 A   5/1991  Muck et al.
5,581,667 A  12/1996  Bloomberg
6,781,720 B1  8/2004  Klassen

*Primary Examiner*—Brian P Werner
*Assistant Examiner*—Elisa M Rice
(74) *Attorney, Agent, or Firm*—Miele Law Group PC

(57) ABSTRACT

Apparatus are provided, which include a color image processor, an edge distinguisher, and an edge trapping mechanism. The color image processor processes color images, including a given color image. The given color image includes plural color separations each having a set of color values for respective image pixels. The edge distinguisher distinguishes some edges of the given color image as opposing edges. An edge is a transition in the color separation of the given color image from a non-white color intensity value, at one side of the edge, to a white intensity value, at the other side of the edge. A given edge is an opposing edge when a transition of the given edge goes, for a separation of the given color image, in one direction from a non-white color value to a white value, and goes, for another separation of the given color image, in the same direction from a white value to a non-white color value.

20 Claims, 3 Drawing Sheets

TRAPPING LUT $$t_i = a_i + (b_i - a_i) * r_i$$

STANDARD EDGE     $r_i \longrightarrow$ 1st - TYPE OF CORRECTION e.g., $\begin{cases} r_i \rightarrow (r_i)^{\gamma_i} & \text{IF } b_i > a_i \\ r_i \rightarrow 1 - (1 - r_i)^{\gamma_i} & \text{IF } b_i < a_i \end{cases}$ OPPOSING EDGE     $r_i \longrightarrow$ 2nd - TYPE OF CORRECTION e.g., $\begin{cases} r_i \rightarrow ((r_i)^{\gamma_i})^{\gamma'_i} = (r_i)^{\gamma_i \gamma'_i} & \text{IF } b_i > a_i \\ r_i \rightarrow 1 - (1 - r_i)^{\gamma_i \gamma'_i} & \text{IF } b_i < a_i \end{cases}$ $i \in \{c, m, y, k\}$

FIG. 3

OPPOSING EDGE TRAPPING

This patent document contains information subject to copyright protection. The copyright owner has no objection to the facsimile reproduction by anyone of the patent document or the patent, as it appears in the US Patent and Trademark Office files or records, but otherwise reserves all copyright rights whatsoever.

FIELD OF THE DISCLOSURE

The present disclosure in different aspects may relate to edge trapping and to methods to improve the quality of halftoned images at or near edges within the image.

BACKGROUND

Various types of imaging devices form color images by combining color separation layers. For example, a photocopier or a printer may reproduce a given two-dimensional color image by combining on one sheet of paper a cyan layer, a magenta layer, a yellow layer, and a black layer. An edge in an image may be formed when there is a transition in a given color separation from a given intensity value in one region in the image (at one side of the edge) to a non-color value (white) (at the other side of the edge). When the transition of the composite image (i.e., with all separations combined) is from a color at one side of the edge to white at the other side of the edge, the edge may be referred to (e.g., in embodiments herein) as a normal edge. When the transition goes, for one separation, in one direction from a color value to white and, for another separation, in the same direction from white to a color value, the edge may be referred to (e.g., in embodiments herein) as an opposing edge.

When an edge common to a few separations is not precisely aligned, i.e., the edge at one separation does not register precisely with the same edge at the other separation, misregistration artifacts are introduced. Trapping reduces or softens the visual impact of these mis-registration artifacts, by, for example, introducing an intermediate trap color between two abutting colors.

There is a need for improved trapping techniques that adequately reduce the mis-registration artifacts in opposing edges.

SUMMARY OF THE DISCLOSURE

Apparatus are provided, including a color image processor, an edge distinguisher, and an edge trapping mechanism. The color image processor processes color images including a given color image. The given color image includes plural color separations, each have a set of color values for respective image pixels. The image pixels correspond to different spatial locations within the color image.

The edge distinguisher is provided to distinguish some edges of the given color image as opposing edges.

An edge includes a transition in a color separation of a given color image from a non-white color intensity value, at one side of the edge, to a white intensity value, at the other side of the edge. A given edge is an opposing edge when a transition of the given edge goes, for one separate of the given color image, in one direction from a non-white color value to a white value, and goes, for another separation of the given color image, in the same direction from a white value to a color value.

The edge trapping mechanism is provided to replace or modify pixels along or near an edge. The edge trapping mechanism applies at least one edge trapping operation to identified edges not distinguished as opposing edges, and it applies a different edge trapping operation to distinguished opposing edges of the given color image.

An edge identifier may be further provided to identify edges within the given color image.

BRIEF DESCRIPTION OF THE DRAWINGS

Embodiments of the disclosure are further described in the detailed description, which follows, by reference to the noted drawings, in which like reference numerals represent similar parts throughout the several views of the drawings, and wherein:

FIG. 3 is a schematic representation of a trapping lookup table (LUT) and equations for effecting first and second order gamma correction in standard and opposing edges.

DETAILED DESCRIPTION

In the embodiments herein, a given two-dimensional image may, for example, be defined by a pattern (for example, an array) of pixels. Each pixel may correspond to a defined location in the image (for example, a grid cell), and includes tone information. In the embodiments herein, for a given point (for example, corresponding to a pixel or region of an image) tone information may refer to a color component (related to one or more frequencies of visible light) and an intensity component (related to a radiant intensity of the pixel).

In a color image, by way of example, a given pixel may have tone information defined in terms of several color values—C for cyan, M for magenta, Y for yellow, and K for black. In simplified terms, the magnitude of each of these values may represent the intensity of the individual color at the pixel's location. Each color component of an image may be referred to as a layer of the image or a separation of the image. The color image is a composite of the complete set of separations.

These separations may be represented with numerical values (i.e., in a virtual form) or physically with layers of ink or toner, for example, when the physical image is produce on a piece of paper by, for example, a printer or photocopy device.

Figure 1:
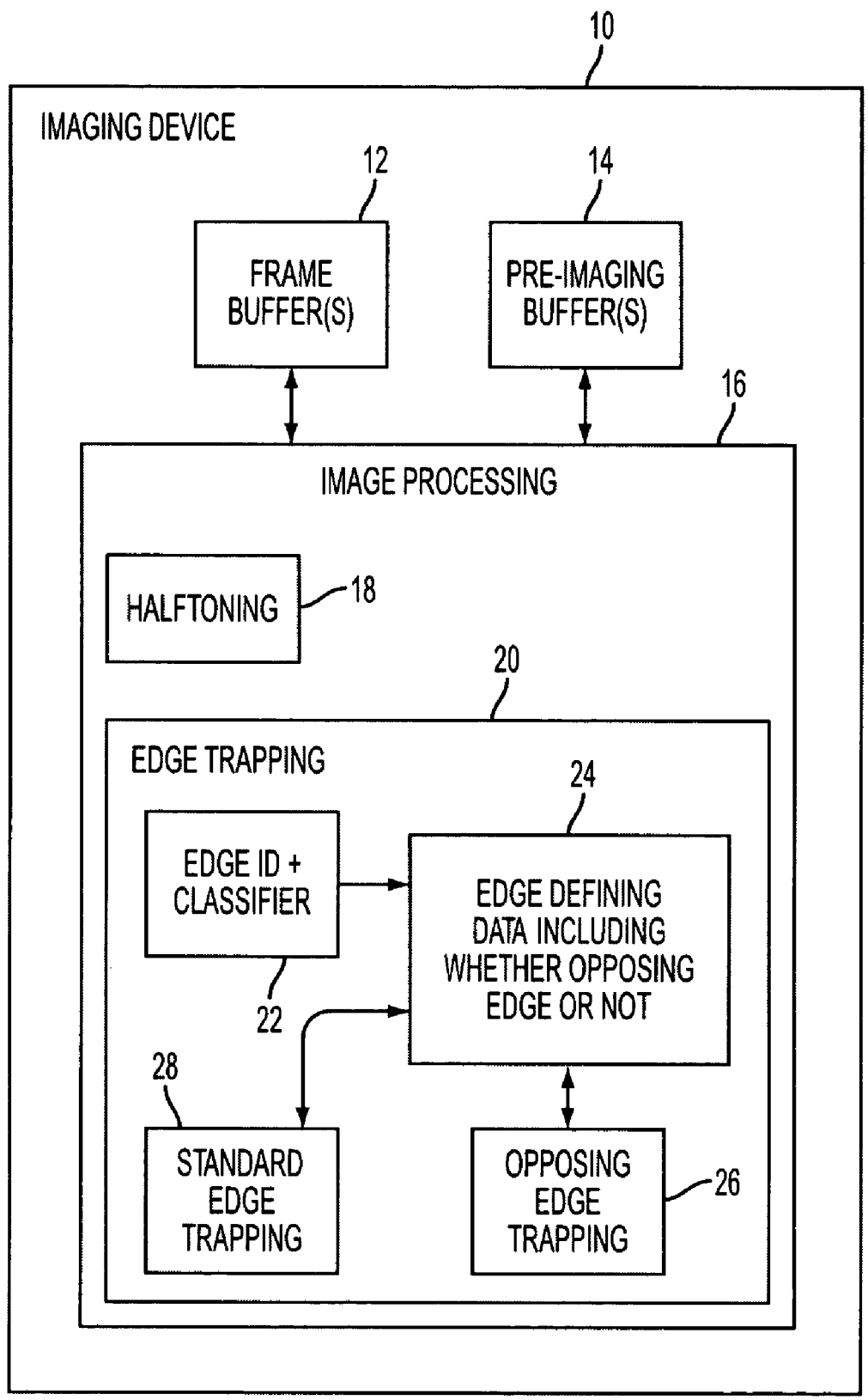
FIG. 1 is a block diagram of an imaging device.

FIG. 1 shows an imaging device 10. The illustrated imaging device may include, for example, a xerographic machine, a photocopier machine, a printer, or an electronic image data file application (which application produces, for example, TIF, JPEG, Adobe PDF files representing a given image). The illustrated imaging device 10 includes, among other elements not specifically shown, one or more frame buffers 12, one or more pre-imaging buffers 14, and image processing circuitry 16. The illustrated image processing circuitry 16 includes a halftoning mechanism 18 and an edge trapping mechanism 20.

The illustrated edge trapping mechanism 20 includes an edge identification and classification mechanism 22, encoded representations of edge defining data 24, a standard edge trapping mechanism 28, and an opposing edge trapping mechanism 26.

Image data is stored in one or more frame buffers 12, and the image is processed by image processing circuitry 16. As the image is processed, the pixel data for the image is updated in frame buffer(s) 12. Before the image is printed or displayed or stored in a final file, a given image frame that has already been processed is stored in pre-imaging buffers 14.

Image processing circuitry 16 will, among other functions, carry out halftoning on a given image frame, with the use of halftoning mechanism 18. Edges will be identified and classified by edge identification and classification mechanism 22 of edge trapping mechanism 20. Those identified and classified edges will then be processed in order to reduce or soften the visual impact of mis-registration artifacts caused by the edge. In identifying and classifying an edge, edge identification and classification mechanism 22 produces edge defining data 24. That data includes data indicating whether or not a given edge is an opposing edge or not.

In accordance with whether the edge is an opposing edge or a standard edge, one of standard edge trapping mechanism 28 and opposing edge trapping mechanism 26 processes the edge in order to reduce the effects of mis-registration artifacts. Specifically, in the illustrated embodiment, those edge trapping mechanisms introduce an intermediate trap color between the abutting colors of the edge.

The illustrated image processor 16 processes color images, including a given color image. A given color image processed will include plural color separations, each having a set of color values for respective image pixels. In the illustrated embodiment, the complete set of color separations for a given color image includes cyan, magenta, yellow, and black separations.

Figure 2:
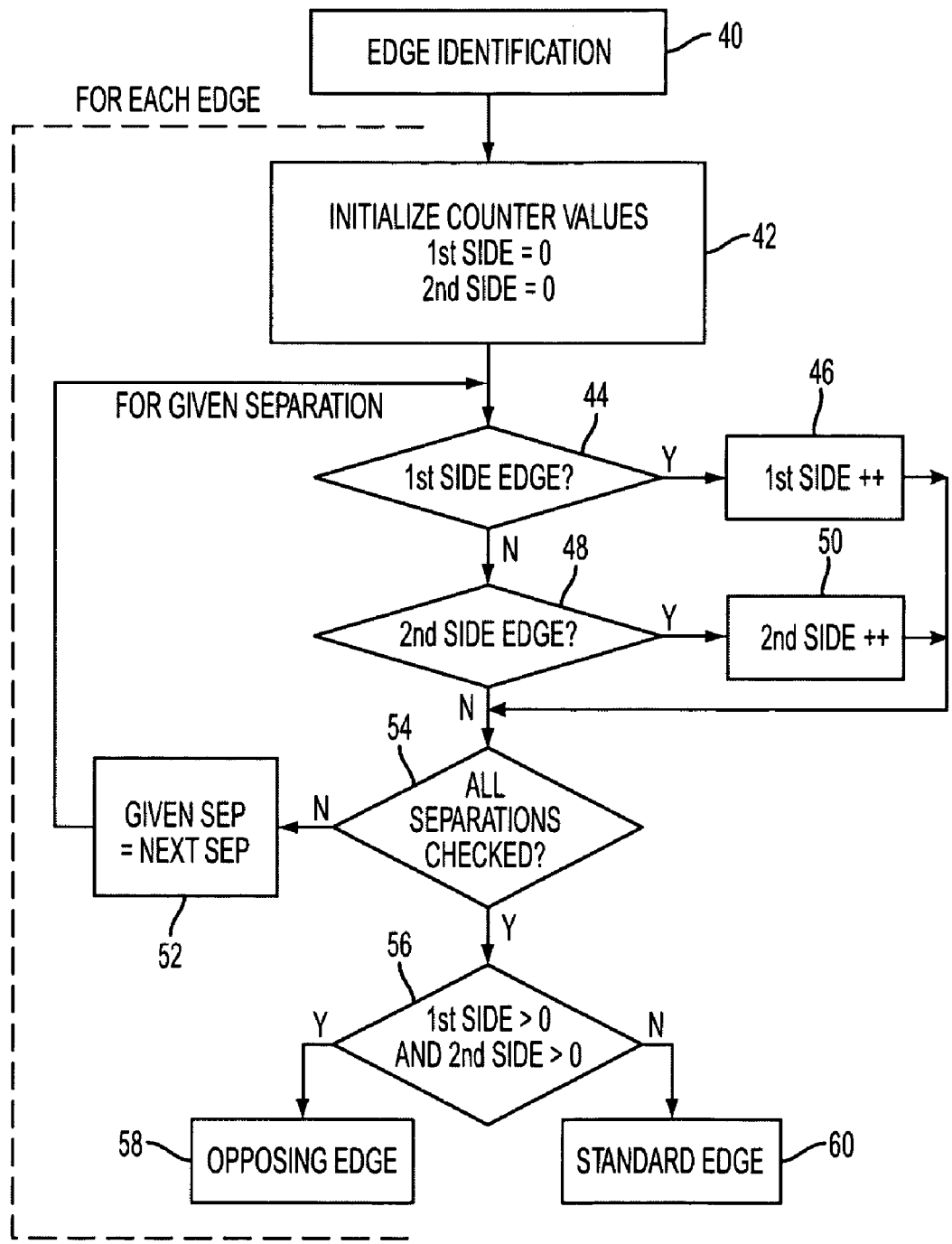
FIG. 2 is a flow chart of an edge identification process.

FIG. 2 illustrates a flow chart of an edge identification process, performed by edge identification and classification mechanism 22, to identify an edge and then to classify that edge as either a standard edge or an opposing edge. This process thus distinguishes those edges which are opposing edges from other edges within the image.

As indicated at act 40, the process involves edge identification. In this act, all edges within the given image that require edge trapping processing are identified. This may be done, for example, using one or more simple methods for identifying edges. For example, for vector-type data, one can use color as a key to identify edges.

In act 42, for a given edge that has been identified, counter values are initialized. These counter values include a first side counter, which is set to zero, and a second side counter, which is also set to zero. For a given edge, processing is performed for each separation within the image. Accordingly, at act 44, a determination is made as to whether there is an edge along the first side of the transition. This means that coming from the first side of the transition, (for example, from the left side if the transition runs vertically within the image), the value of the separation goes from a color value to a white value as one passes across the transition from the left side to the right side of the transition. If the edge is not a first side edge, i.e., the color does not go from a color value to a white value when passing from the first side of the edge through the transition to the second side of the edge, then a determination is made at act 48 as to whether or not the edge is a second side edge.

The edge will be a second side edge if, while going from the second side of the transition across the transition to the first side of the transition, the color value for a given separation will be a non-white color value on the second side and a white value on the first side of that transition. If the edge is not a second side edge, the process proceeds to act 54 for that separation.

If, at act 44, a determination is made that, for that separation, the edge is a first side edge, the process proceeds to act 46, where the counter value "first side" is incremented by 1. If at act 48, a determination is made that a second side edge exists for that separation, the "second side" counter value will be incremented at act 50. Once either of acts 46 or 50 is completed, the process proceeds to act 54, where a determination is made as to whether all separations for the given edge have been checked. If all separations have been checked, the process proceeds to act 56. If all separations have not been checked for the given edge, the process proceeds to act 52, where the process moves on to the next separation. Accordingly, the process returns to act 54, for the next separation.

Once all separations have been checked, the process proceeds from act 54 to act 56. If the first side and the second side counter values are each greater than zero, the edge is deemed an opposing edge, and thereby distinguished as an opposing edge, as indicated at act 58.

If either of the first side and the second side counter values is zero, the process proceeds from act 56 to act 60, where the edge defining data for this edge is provided with a parameter indicating that it is a standard edge.

As illustrated in FIG. 3, standard and opposing edge trapping mechanisms 28 and 26 may perform a first type of correction to standard edges and a second type of correction to opposition edges. For example, for a standard edge, the first type of correction may involve a gamma correction, a lookup table (LUT) correction, and/or a tone-reproduction-curve (TRC) correction. The second type of correction may be a modified version to the first type of correction or it may be in addition to the first type of correction. Examples of a second type of correction include a gamma correction, a LUT correction, and/or a TRC correction.

The following describes an embodiment where the first and second types of correction respectively include first and second order gamma corrections, using a lookup table (LUT) formed in accordance with certain equations as noted below. The input of LUT in the illustrated embodiment is an 8-dimensional data point ($a_c$, $a_m$, $a_y$, $a_k$; $b_c$, $b_m$, $b_y$, $b_k$). These data points correspond to intersecting color values of the intersecting pixels. The output of the illustrated LUT includes trap percentages ($r_c$, $r_m$, $r_y$, $r_k$), for each separation and the trapping offset. The final trap color, t, in the illustrated embodiment, is:

$$t_i = a_i + (b_i - a_i) * r_i, \text{ where i is from the set [c,m,y,k]}$$

To account for edge nonlinearities, a gamma correction may be applied to all the trap percentages in the table. Accordingly, a first-order gamma correction may be used to replace $r_i$ in the above equation with:

$$r_i \rightarrow (r_i)^{\gamma_i} \text{ if } b_i > a_i, \text{ or}$$

$$r_i 1 - (1 - r_i)^{\gamma_i} \text{ if } b_i < a_i.$$

This $1^{st}$-order gamma correction ensures an increment of the percentage for $\gamma_i < 1$.

The symbol γ represents a gamma value, which may be empirically determined.

In general, the first-order gamma correction may reasonably correct for edge nonlinearities for intersections involving colors in the mid tones. However, in situations where there are transitions from white values to mid tones (for any separation), the edge pullback of the engine may become substantial, and the first order gamma correction may be inadequate. This problem may be compounded where there are two separations that exhibit such edges in opposite directions at the interface, described and mentioned above as an "opposing edge". When an opposing edge is identified, a second-order gamma correction may be applied. When an opposing edge is identified, an extra gamma correction with $\gamma_i'$ where $i \in \{c,m,y,k\}$, is applied on the existing gamma corrected trap percentages. This results in the final gamma of $\gamma_i \gamma_i'$ (replacing $r_i$ in Eq. (2) with $((r_i)^{\gamma_i})^{\gamma_i'} = (r_i)^{\gamma_i \gamma_i'}$ if $b_i > a_i$, or $1 - (1 - r_i)^{\gamma_i \gamma_i'}$ if $b_i < a_i$, where $i \in \{c,m,y,k\}$). The proposed conditional gamma correction ensures that the trap quality at the non-opposing edges remains the same.

The claims as originally presented and as they may be amended, encompass variations, alternatives, modifications, improvements, equivalents and substantial equivalents of the embodiments and teachings disclosed herein, including those that are presently unforeseen or unappreciated, and that, for example, may arise from applicants/patentees and others.

What is claimed is:

1. Apparatus comprising:
a color image processor to process color images including a given color image, the given color image including plural color separations each having a set of color values for respective image pixels, the image pixels corresponding to different spatial locations within the given color images;
an edge distinguisher to distinguish and thereby identify some edges of the given image as opposing edges and others as non-opposing edges, a given edge being an opposing edge when a transition of the given edge goes, for one separation of the given color image, in one direction from a non-white color value to a white value, and goes, for another separation of the given color image, in the same direction from a white value to a color value, and another edge being a non-opposing edge when it includes a transition in a composite of color separations of the given color image from a non-white color intensity value, at one side of the edge, to a white intensity value, at the other side of the edge; and
an edge trapping mechanism to replace or modify pixels along or near an edge, the edge trapping mechanism applying at least one edge trapping operation to the identified non-opposing edges not distinguished as opposing edges and applying a different edge trapping operation to the distinguished opposing edges.

2. The apparatus according to claim 1, further comprising an edge identifier to identify edges within the given color image.

3. The apparatus according to claim 1, wherein the edge trapping mechanism includes a mechanism to replace or modify pixels along the edge by introducing an intermediate trap color between two abutting regions forming the edge.

4. The apparatus according to claim 1, wherein the edge distinguisher includes first side and second side determiners, the first side determiner to determine when a first side of the given edge has a non-white value and the second side determiner to determine when a second side of the given edge has a non-white value.

5. The apparatus according to claim 4, wherein the edge distinguisher further includes an opening edge determiner to determine for the given edge when the first and second side determiners have each determined (i) that at least one first side from among all the separations of the given edge has a non-white value and (ii) that at least one second side from among all the separations of the given edge has a non-white value.

6. The apparatus according to claim 1, wherein the edge trapping mechanism includes a lookup table.

7. The apparatus according to claim 6, wherein the lookup table includes eight input data points and four output data points, the input data points including intensity values for four different separations of a first pixel on one side of the edge and intensity values for four different separations for a second pixel on another side of the edge abutting the first pixel, and the output values including four different trap percentages, including a different respective trap percentage for each separation at the intersection of the first and second pixels.

8. Apparatus comprising:
a color image processor to process color images including a given color image, the given color image including plural color separations each having a set of color values for respective image pixels, the image pixels corresponding to different spatial locations within the given color images;
an edge distinguisher to distinguish and thereby identify some edges of the given image as opposing edges and others as non-opposing edges, a given edge being an opposing edge when a transition of the given edge goes, for one separation of the given color image, in one direction from a non-white color value to a white value, and goes, for another separation of the given color image, in the same direction from a white value to a color value, and another edge being a non-opposing edge when it includes a transition in a composite of color separations of the given color image from a non-white color intensity value, at one side of the edge, to a white intensity value, at the other side of the edge; and
an edge trapping mechanism to replace or modify pixels along or near an edge, the edge trapping mechanism applying at least one edge trapping operation to the identified non-opposing edges not distinguished as opposing edges and applying a different edge trapping operation to the distinguished opposing edges;
wherein the edge trapping mechanism includes a lookup table;
wherein the lookup table includes eight input data points and four output data points, the input data points including intensity values for four different separations of a first pixel on one side of the edge and intensity values for four different separations for a second pixel on another side of the edge abutting the first pixel, and the output values including four different trap percentages, including a different respective trap percentage for each separation at the intersection of the first and second pixels; and
wherein the output trap percentages output by the lookup table are used to determine a trap color for an intersecting point, a given separation intensity value of the trap color intersecting point being equal to the corresponding separation intensity value for the first pixel plus a difference between the corresponding separation intensity values of the first and second pixels times the corresponding trap percentage, the corresponding trap percentage being modified in accordance with a first-order gamma correction when the edge is not distinguished as an opposing edge and being modified in accordance with a second-order gamma correction when the edge is distinguished as an opposing edge.

9. A method comprising:
processing with a color image processor color images including a given color image, the given color image including plural color separations each having a set of color values for respective image pixels, the image pixels corresponding to different spatial locations within the given color image;
distinguishing and thereby identifying some edges of the given color image as opposing edges and others as non-opposing edges, a given edge being an opposing edge when a transition of the given edge goes, for one separation of the given color image, in one direction from a non-white color value to a white value, and goes, for another separation of the given color image, in the same direction from a white value to a color value, and another edge being a non-opposing edge when it includes a transition in a composite of color separations of the given color image from a non-white color intensity value, at one side of the edge, to a white intensity value, at the other side of the edge; and replacing or modifying pixels along or near an edge, by applying at least one edge trapping operation to the identified non-opposing edges not distinguished as opposing edges and applying a different edge trapping operation to the distinguished opposing edges.

10. The method according to claim 9, further comprising identifying edges within the given color image.

11. The method according to claim 9, wherein pixels are replaced or modified along the edge by introducing an intermediate trap color between two abutting regions forming the edge.

12. The method according to claim 9, wherein the distinguishing includes determining when a first side of a given edge has a non-white value and determining when a second side of the given edge has a non-white value.

13. The method according to claim 12, wherein the distinguishing further includes determining for the given edge (i) that a least one first side from among all the separations of the given edge has a non-white value and (ii) that at least one second side from among all the separations of the given edge has a non-white value.

14. The method according to claim 9, further comprising edge trapping using a lookup table.

15. The method according to claim 14, wherein the lookup table includes eight input data points and four output data points, the input data points including intensity values for four different separations of a first pixel on one side of the edge and intensity values for a second pixel on another side of the edge abutting the first pixel, and the output values including four different trap percentages, including a different respective trap percentage for each separation at the intersection of the first and second pixels.

16. A method comprising:
processing with a color image processor color images including a given color image, the given color image including plural color separations each having a set of color values for respective image pixels, the image pixels corresponding to different spatial locations within the given color image;

distinguishing and thereby identifying some edges of the given color image as opposing edges and others as non-opposing edges, a given edge being an opposing edge when a transition of the given edge goes, for one separation of the given color image, in one direction from a non-white color value to a white value, and goes, for another separation of the given color image, in the same direction from a white value to a color value, and another edge being a non-opposing edge when it includes a transition in a composite of color separations of the given color image from a non-white color intensity value, at one side of the edge, to a white intensity value, at the other side of the edge; and replacing or modifying pixels along or near an edge, by applying at least one edge trapping operation to the identified non-opposing edges not distinguished as opposing edges and applying a different edge trapping operation to the distinguished opposing edges;

further comprising edge trapping using a lookup table;

wherein the lookup table includes eight input data points and four output data points, the input data points including intensity values for four different separations of a first pixel on one side of the edge and intensity values for four different separations for a second pixel on another side of the edge abutting the first pixel, and the output values including four different trap percentages, including a different respective trap percentage for each separation at the intersection of the first and second pixels; and wherein the output trap percentages output by the lookup table are used to determine a trap color for an intersecting point, a given separation intensity value of the trap color intersecting point being equal to the corresponding separation intensity value for the first pixel plus a difference between the corresponding separation intensity values of the first and second pixels times the corresponding trap percentage, the corresponding trap percentage being modified in accordance with a first-order gamma correction when the edge is not distinguished as an opposing edge and being modified in accordance with a second-order gamma correction when the edge is distinguished as an opposing edge.

17. Machine-readable media encoded with data, the encoded data when read by a machine causing:
processing with a color image processor color images including a given color image, the given color image including plural color separations each having a set of color values for respective image pixels, the image pixels corresponding to different spatial locations within the given color image;

distinguishing and thereby identifying some edges of the given color image as opposing edges and others as non-opposing edges, a given edge being an opposing edge when a transition of the given edge goes, for one separation of the given color image, in one direction from a non-white color value to a white value, and goes, for another separation of the given color image, in the same direction from a white value to a color value, and another edge being a non-opposing edge when it includes a transition in a composite of color separations of the given color image from a non-white color intensity value, at one side of the edge, to a white intensity value, at the other side of the edge; and replacing or modifying pixels along or near an edge, by applying at least one edge trapping operation to the identified non-opposing edges not distinguished as opposing edges and applying a different edge trapping operation to the distinguished opposing edges.

18. The machine-readable media of claim 17, the encoded data when read by a machine further causing:
identifying edges within the given color image.

19. The machine-readable media of claim 17, the encoded data when read by a machine further causing:
introducing an intermediate trap color between two abutting regions forming the edge.

20. The machine-readable media of claim 17, the encoded data when read by a machine further causing:
determining when a first side of a given edge has a non-white value and determining when a second side of the edge has a non-white value.

* * * * *